United States Patent
Blanc et al.

(10) Patent No.: US 7,536,834 B2
(45) Date of Patent: *May 26, 2009

(54) LIGHT-CONVERTING MATERIAL COMPRISING A BARIUM MAGNESIUM SILICATE AS ADDITIVE

(75) Inventors: Wilfried Blanc, Nice (FR); Claude Ceintrey, Marly-le-Roy (FR); Claude Fouassier, Gradignan (FR); Thierry Le Mercier, Paris (FR)

(73) Assignee: Rhodia Electronics & Catalysis, La Rochelle (FR)

( * ) Notice: Subject to any disclaimer, the term of this patent is extended or adjusted under 35 U.S.C. 154(b) by 569 days.

This patent is subject to a terminal disclaimer.

(21) Appl. No.: 10/533,695

(22) PCT Filed: Nov. 4, 2003

(86) PCT No.: PCT/FR03/03283

§ 371 (c)(1),
(2), (4) Date: Nov. 9, 2005

(87) PCT Pub. No.: WO2004/044090

PCT Pub. Date: May 27, 2004

(65) Prior Publication Data

US 2006/0168905 A1    Aug. 3, 2006

(30) Foreign Application Priority Data

Nov. 5, 2002   (FR)   .................. 02 13832

(51) Int. Cl.
*E04B 1/32*   (2006.01)
*E04G 11/04*   (2006.01)

(52) U.S. Cl. .................. 52/247; 252/588; 252/301.4 F; 252/301.6 F

(58) Field of Classification Search ............... 252/588, 252/301.6 S, 301.4 R; 52/247
See application file for complete search history.

(56) References Cited

U.S. PATENT DOCUMENTS

| 3,544,482 A | 12/1970 | Barry |
| 5,194,332 A | 3/1993 | Kasenga et al. |
| 5,853,706 A | 12/1998 | Klar |
| 6,264,855 B1 | 7/2001 | Kitagawa et al. |
| 2007/0295116 A1* | 12/2007 | Le Mercier et al. ........... 73/866 |
| 2008/0035888 A1* | 2/2008 | Ceintrey et al. ....... 252/301.6 S |

FOREIGN PATENT DOCUMENTS

| DE | 201 03 618 U1 | 9/2001 |
| EP | 0 921 172 A1 | 6/1999 |
| EP | 0 972 815 A1 | 1/2000 |
| GB | 829546 | 3/1960 |
| JP | 2-83622 | 12/1991 |
| JP | 9-150439 | 5/1997 |
| JP | 9-241703 | 3/1999 |
| JP | 2008-088237 A * | 4/2008 |
| WO | WO2005/068584 A1 * | 7/2005 |
| WO | WO2008/078711 A1 * | 7/2008 |

OTHER PUBLICATIONS

Umetsu, Yousuke; Okamoto, Shinji; Yamamoto, Hajime, Photoluminescence Properties of Ba3MgSi2O8:Eu2+ Blue Phosphor and Ba3MgSi2O8:Eu2+,Mn2+ Blue-Red Phosphor under Near-Ultraviolet-Light Excitation, Journal of the Electrochemical Society (2008), 155(7), J193-J197, Tokyo Kagaku Kenkyusho Company, Limited, Yamato, Kanagawa, 242-0001, Japan.*

* cited by examiner

*Primary Examiner*—Lorna M Douyon
*Assistant Examiner*—Bijan Ahvazi
(74) *Attorney, Agent, or Firm*—Buchanan, Ingersoll & Rooney P.C.

(57) ABSTRACT

The invention concerns a light transforming material, in particular for greenhouse walls, comprising as additive a barium and magnesium silicate of formula $Ba_{3(1-x)}Eu_{3x}Mg_{1-y}Mn_ySi_2O_8$, wherein $0<x\leq0.3$ and $0<y\leq0.3$ and $0<y=0.3$. The material is capable of transforming solar energy of UV range into a red light. The material can also be used in paints and cosmetics.

9 Claims, 2 Drawing Sheets

LIGHT-CONVERTING MATERIAL COMPRISING A BARIUM MAGNESIUM SILICATE AS ADDITIVE

This application is an application under 35 U.S.C. Section 371 of International Application Number PCT/FR03/03283 filed on Nov. 04, 2003.

SUMMARY OF THE INVETION

The present invention relates to a light-converting material, especially for greenhouse walls, comprising a barium magnesium silicate as additive.

For the purposes of the present description, the term "light-converting material" means a material that is especially capable of converting UV radiation into red light. The need for such a material exists in several technical fields.

Thus, polymers and mineral glasses are widely used for manufacturing agricultural greenhouse walls. These polymers or these mineral glasses must satisfy specific technical characteristics to allow optimum protection and growth of the crops.

Materials that allow the most efficient use possible of sunlight are sought in particular. It is especially known that radiation in the red-orange field, i.e. having wavelengths of between about 500 nm and about 700 nm, is particularly useful for the growth of plants, and especially promotes photosynthesis, whereas radiation in the ultraviolet range is not absorbed by plants.

There are also other fields, for instance the field of cosmetics or paints, in which materials that can emit especially in the red range when they are subjected to UV radiation are sought.

The object of the present invention is to provide a material that is capable of converting UV radiation and especially solar energy of the UV range into red light, in particular into a light that is more readily assimilable or usable for plants.

With this aim, the light-converting material according to the invention is of the type comprising a matrix and an additive and is characterized in that it comprises as additive a compound of formula:

$$Ba_{3(1-x)}Eu_{3x}Mg_{1-y}Mn_ySi_2O_8 \quad (1)$$

in which $0<x\leq0.3$ and $0<y\leq0.3$. , wherein $0<x\leq0.3$ and $0<y\leq0.3$.

BRIEF DESCRIPTION OF THE DRAWINGS

Other characteristics, details and advantages of the invention will emerge even more fully on reading the description that follows and from the attached drawing, in which.

DETAILED DESCRIPTION OF THE INVENTION

Figure 1:
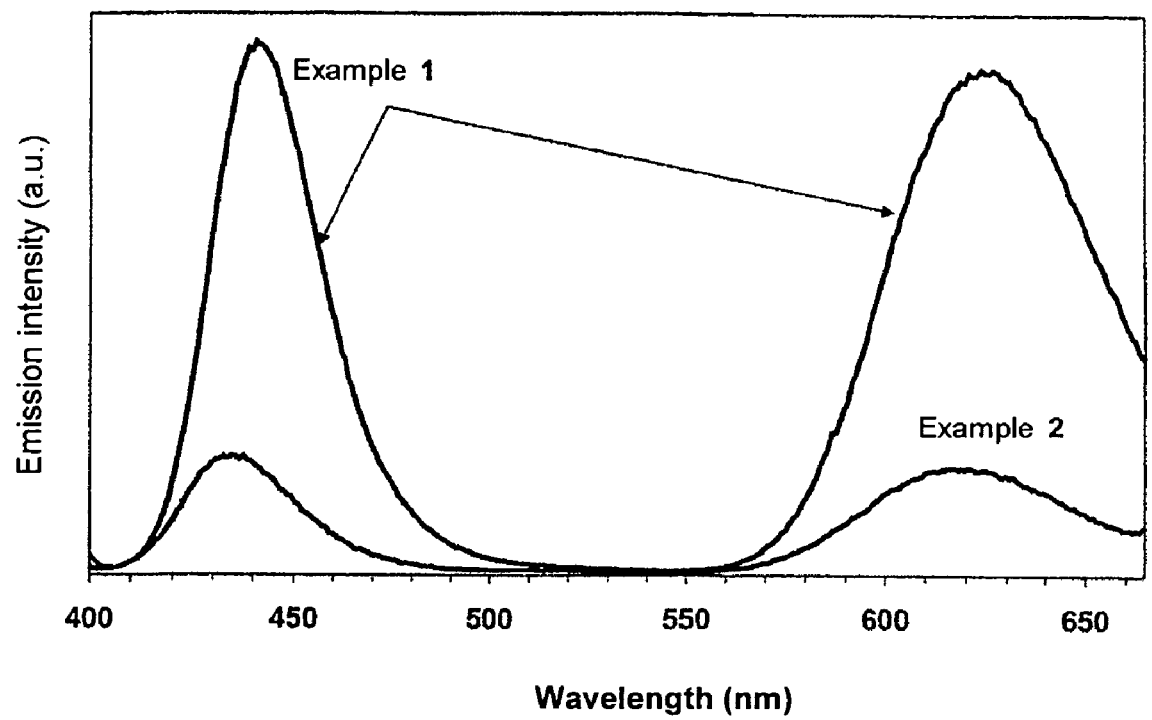
FIG. 1 is a graph that represents the emission spectra of two additives according to the invention for an excitation wavelength of 370 nm.

The invention applies to any type of material based on a matrix and an additive and which, by virtue of its mechanical and/or optical properties, is used or is able to be used in an application in which it is desired to convert a UV radiation into red light especially, or alternatively to convert UV radiation, and especially solar UV radiation, into lower-energy radiation.

This matrix may be a natural or nonnatural fiber, such as silk, wool, cotton or hemp, or alternatively viscose, nylon, polyamides, polyester and copolymers thereof.

The matrix may also be a mineral glass (silicate) or an organic glass.

The matrix may also be based on a polymer especially of thermoplastic type.

As examples of thermoplastic polymers that are suitable for the invention, mention may be made of: polycarbonates, for instance poly[methanebis(4-phenyl) carbonate], poly[1,1-etherbis(4-phenyl) carbonate], poly[diphenylmethanebis(4-phenyl) carbonate], poly[1,1-cyclohexanebis(4-phenyl) carbonate] and polymers of the same family; polyamides, for instance poly(4-aminobutyric acid), poly(hexamethylene adipamide), poly(6-aminohexanoic acid), poly(m-xylylene adipamide), poly(p-xylylene sebacamide), poly(2,2,2-trimethyl hexamethylene terephthalamide), poly(meta-phenylene isophthalamide), poly(p-phenylene terephthalamide) and polymers of the same family; polyesters, for instance poly (ethylene azelate), poly(ethylene-1,5-naphthalate), poly(1,4-cyclohexanedimethylene terephthalate), poly(ethylene oxybenzoate), poly(para-hydroxybenzoate), poly(1,4-cyclohexylidene dimethylene terephthalate), poly(1,4-cyclohexylidene dimethylene terephthalate), polyethylene terephthalate, polybutylene terephthalate and polymers of the same family; vinyl polymers and copolymers thereof, for instance polyvinyl acetate, polyvinyl alcohol, polyvinyl chloride; polyvinyl butyral, polyvinylidene chloride, ethylene-vinyl acetate copolymers, and polymers of the same family; acrylic-polymers, polyacrylates and copolymers thereof, for instance polyethyl acrylate, poly(n-butyl acrylate), polymethyl methacrylate, polyethyl methacrylate, poly(n-butyl methacrylate), poly(n-propyl methacrylate), polyacrylamide, polyacrylonitrile, poly(acrylic acid), ethylene-acrylic acid copolymers, ethylene-vinyl alcohol copolymers, acrylonitrile copolymers, methylstyrene methacrylate copolymers, ethylene-ethyl acrylate copolymers, methacrylate-butadiene-styrene copolymers, ABS, and polymers of the same family; polyolefins, for instance low-density poly(ethylene), poly (propylene) and in general α-olefins of ethylenes and of propylene copolymerized with other α-olefins such as 1-butene and 1-hexenes, which may be used at up to 1%. Other comonomers used may be cyclic olefins such as 1,4-hexadiene, cyclopentadiene and ethylidenenorbornene. The copolymers may also be a carboxylic acid such as acrylic acid or methacrylic acid. Finally, mention may be made of low-density chlorinated poly(ethylene), poly(4-methyl-1-pentene), poly(ethylene) and poly(styrene).

Among these thermoplastic polymers, the ones most particularly preferred are polyethylenes including LDPE (low-density polyethylenes), LLDPE (linear low-density polyethylenes), polyethylenes obtained via metallocene synthesis, PVC (polyvinyl chloride), PET (polyethylene terephthalate), polymethyl methacrylate, copolyolefins such as EVA (polyethylene-vinyl alcohol or ethylene vinyl acetate), and mixtures and copolymers based on these (co)polymers, and polycarbonate.

The polymer may be in rigid form and in the form of a sheet or a plate a few millimeters thick, for example in the case of polyvinyl chloride, methyl methacrylate or polycarbonate. It may also be in the form of a film a few tens of microns thick or even from a few microns to a few tenths of a millimeter thick, for example in the case of polyurethanes, ethylene-vinyl acetate copolymers, low-density polyethylenes or copolymers of ethylene-tetrafluoroethylene or polyvinyl chloride.

These films, sheets or plates may by themselves constitute the matrix of the material according to the invention. However, a more complex constitution may also be envisioned. Thus, the material of the invention may be deposited on or combined with another substrate, such as the thermoplastics described previously. This deposit or this combination may be prepared by the known methods of coextrusion, lamination and coating. Multilayer structures may be formed from one or more layers of material according to the invention, combined via layers of coextrusion binder to one or more other layers of one or more thermoplastic polymers (for example polyethylene or polyvinyl chloride) which may constitute a support component, which is predominant in the constitution of the film. The films thus obtained may be monoaxially or biaxially drawn, according to the known techniques for converting thermoplastics. The sheets or plates may be cut, thermoformed or stamped in order to give them the desired shape.

The material of the invention may also be in the form of a matrix based on a paint or varnish or a latex, this matrix possibly being deposited by coating onto an organic or mineral substrate, for instance a glass.

The term paint or varnish means the formulations or compositions usually denoted by this term in the technical field of paints and which are, for example, based on the following resins in emulsion: alkyd resins, the most common of which is known as glycerophthalic resin; resins modified with long or short oil; acrylic resins derived from esters of acrylic (methyl or ethyl) acid and methacrylic acid optionally copolymerized with ethyl acrylate, 2-ethylhexyl acrylate or butyl acrylate, and also acrylic-isocyanate resins; vinyl resins, for instance polyvinyl acetate, polyvinyl chloride, polyvinyl butyral, polyvinyl formal, and copolymers of vinyl chloride and vinyl acetate or vinylidene chloride; aminoplast or phenolic resins, which are usually modified; polyester resins; polyurethane resins; epoxy resins; silicone resins; cellulose-based or nitrocellulose-based resins.

The term "latex" means aqueous dispersions of polymer particles derived from standard processes of emulsion (co)polymerization of polymerizable organic monomers.

These organic monomers may be chosen, for example, from alkyl (meth)acrylates, $\alpha,\beta$-ethylenically unsaturated esters; $\alpha,\beta$-ethylenically unsaturated polycarboxylic acid esters and hemiesters; vinyl halides; vinyl aromatics; conjugated aliphatic dienes; $\alpha,\beta$-ethylenically unsaturated nitrites; polyvinyl acetate latices, isocyanates and polyols.

According to the invention, the material as described above contains as additive a barium magnesium silicate, doped with europium, which may be considered as partial replacement for the barium, and with manganese, which may be considered as partial replacement for the magnesium, this silicate corresponding to formula (1) given hereinabove.

When it is subjected to UV or near-UV (UVA) excitation, that is to say to radiation in a wavelength range of between about 250 nm and about 390 nm, this additive has the property of emitting especially in the red range and also in the blue range, i.e. in a wavelength range of between about 370 nm and about 500 nm (between 400 nm and 500 nm for the blue range and between 550 nm and 700 nm for the red range) with a good yield.

According to a first embodiment, the compound corresponds to the abovementioned formula (1) in which $0.0001 \leq x \leq 0.25$ and $0.0001 \leq y \leq 0.25$.

According to another more particular embodiment, the compound corresponds to the abovementioned formula (1) in which $0.01 \leq x \leq 0.25$ and $0.01 \leq y \leq 0.25$.

It may be noted that it is advantageous to have a concentration of europium in the compound of at least 0.01% in order to obtain an emission of better intensity. It is also advantageous to have a concentration of europium and of manganese of not more than 25% in order to minimize the adverse phenomena of self-extinction. The percentages indicated above correspond to the molar degrees of substitution of the doping ions $Eu^{2+}$ and $Mn^{2+}$ respectively, with the $Ba^{2+}$ and $Mg^{2+}$ ions.

According to another preferred embodiment, the compound of formula (1) has the following values of x and y: $0.01 \leq x \leq 0.03$ and $0.04 \leq y \leq 0.06$. For these values of x and y, the emission intensity is the greatest.

Finally, in the compound of formula (1), the barium, magnesium and silicon may be partially replaced with elements other than those described above. Thus, the barium may be partially replaced with calcium and/or strontium in a proportion that may be up to about 30%, this proportion being expressed by the replacement/(replacement+barium) atomic ratio. The magnesium may be partially replaced with zinc in a proportion that may be up to about 30%, this proportion also being expressed by the Zn/(Zn+Mg) atomic ratio. Finally, the silicon may be partially replaced with germanium, aluminum and/or phosphorus in a proportion that may be up to about 10%, this proportion being expressed by the replacement/(replacement+silicon) atomic ratio.

The amount of silicate in the material may especially be between 0.01% and 10% by mass and more particularly between 0.1% and 1% by mass relative to the total mass of the material. These values are given purely by way of example, and they may vary as a function of the nature of the matrix. The lower value is set as a function of the intensity of the desired effect that it is desired to obtain. The upper value is not critical; the value above which an additional amount does not give any additional advantage or effect, relative to other constraints, for example cost constraints, is generally not exceeded.

Whereas a europium-doped barium magnesium silicate emits in the blue range, the presence of manganese as dopant makes it possible to orient the emission of this compound toward the red range. It is possible to adjust the colorimetry of the emission of the additive of the invention by varying the Eu/Mn ratio.

Moreover, the additive of the invention has a UV-absorbing capacity that also allows it to provide an anti-UV function and thus to protect the materials in which it is incorporated against UV.

The silicate used for the invention is generally prepared by means of a solid-state reaction at high temperature.

As starting material, it is possible to use directly the metal oxides required or organic or mineral compounds capable of forming these oxides by heating, for instance the carbonates, oxalates, hydroxides, acetates, nitrates or borates of said metals.

An intimate mixture at the appropriate concentrations of all of the starting materials in finely divided form is formed.

It may also be envisioned to prepare a starting mixture by coprecipitation using solutions of the precursors of the desired oxides, for example in aqueous medium.

The mixture of the starting materials is then heated at least once for a period of between one hour and about one hundred hours, at a temperature of between about 500° C. and about 1600° C.; it is preferable to perform the heating at least partially under a reductive atmosphere (for example hydrogen in argon) to bring the europium totally into divalent form.

There is no limitation on the form, morphology, mean particle size or particle size distribution of the silicates thus obtained. These products may be ground, micronized, screened and surface-treated, especially with organic additives, to facilitate their compatibility or dispersion in the application medium.

The material of the invention, besides the matrix based on the elements described above, for instance the fiber, the polymer, the paint or varnish or latex, and the abovementioned compound based on barium magnesium silicate, may also comprise, in a known manner, other additives, for instance stabilizers, plasticizers, flame retardants, dyes, optical brighteners, lubricants, antiblocking agents, matting agents, processing agents, elastomers or elastomeric compositions (for example acrylic copolymers or methacrylate-butadienestyrene copolymers) for improving the flexibility or mechanical strength of the films or sheets, adhesion agents (for example polyolefins grafted with maleic anhydride allowing adhesion to polyamide), dispersants allowing better distribution of the silicate in the material or any other additive required for the preparation of a structure of multilayer thermoplastic films, especially those known and often used for making films for greenhouses (for example nondrip or anti-misting films), or alternatively catalysts. This list is not limiting in nature.

Any method for obtaining a dispersion of the silicate of formula (1) in a matrix and especially in a macro-molecular compound of the type such as the above-mentioned polymers, latices and paints or varnishes may be used to make the material of the invention. In particular, a first process consists in mixing the silicate and the other abovementioned additives in a thermoplastic compound in melt form and optionally in subjecting the mixture to high shear, for example in a twin-screw extrusion device, in order to achieve good dispersion. Another process consists in mixing the additive(s) to be dispersed with the monomers in the polymerization medium, and then in performing the polymerization. Another process consists in mixing with a thermoplastic polymer in melt form, a concentrated blend of a thermoplastic polymer and of dispersed additives, for example prepared according to one of the processes described above.

The silicate may be introduced into the synthesis medium for the macromolecular compound, or into a thermoplastic polymer melt in any form. It may be introduced, for example, in the form of a solid powder or in the form of a dispersion in water or in an organic dispersant.

A process suitable for paints or varnishes or for latices consists in directly dispersing the silicate compound in powder form in the latex or the paint or varnish, for example by stirring, or alternatively in preparing a powder concentrate in liquid or pasty medium, which is then added to the paints or varnishes or to the latex. The concentrate may be prepared in a water-based or solvent medium, optionally with surfactants, water-soluble or hydrophobic polymers, or alternatively polymers comprising hydrophilic and hydrophobic ends, which may be polar or nonpolar, required for stabilization of the mixture in order to avoid its decantation. There is no limit to the additives that may be included in the composition of the concentrate.

The material of the invention may be used most particularly in the manufacture or construction of greenhouse walls. The term "greenhouse" should be understood herein in its broadest sense as covering any type of shelter used in agriculture for the protection and growth of crops. For example, they may be plastic greenhouses and large plastic tunnels, glass greenhouses, large shelters, semi-forcing tunnels, flat protective sheets, mulching, etc., as described in the brochure published by the CIPA (Congrès International du Plastique dans l'Agriculture), 65 rue de Prony, Paris, "L'évolution de la plasticulture dans le Monde" by Jean-Pierre Jouët.

The invention thus relates to walls for greenhouses that comprise a material as described above.

The material of the invention may also be used in cosmetics, in particular in the preparation of nail varnishes and styling gels.

Nail varnishes generally contain:
a nitrocellulose-based film-forming agent,
a resin, natural dammar resin or synthetic resin of the formaldehyde-sulfamide, polystyrene resin, polyvinyl resin, etc. type,
a plasticizer, for example diethyl phthalate, dibutyl phthalate, dioctyl phthalate, tricresyl phosphate, n-butyl stearate, resorcinol diacetate or a mixture thereof,
a dissolver such as ethyl alcohol, isopropyl alcohol, butyl alcohol, isobutyl alcohol, ethyl acetate, butyl acetate or, usually, a mixture of these solvents,
a diluent, especially toluene or xylene,
optionally, other additives, fragrance or nacreous product (flakes of mica coated with bismuth oxychloride or with titanium dioxide).

An example of a typical composition is given below:
from 10% to 15% by weight of nitrocellulose,
from 10% to 15% by weight of resin,
from 3% to 5% by weight of plasticizer(s),
qs 100% by weight of solvent(s).

In the implementation of the invention targeted herein, varnish constitutes the matrix and the compound of formula (1) is present as additive in this matrix. For the preparation of this varnish, the compound is generally ground in a plastic mass consisting of nitro-cellulose and of plasticizer(s), which is then dissolved in the solvent(s). The amount of compound used is usually from 1% to 5% by mass relative to the varnish. It should be noted that these values are given as a guide and that they are not critical. They may be modified as a function of the intensity of the desired effect, i.e. luminescence in the red range, and of the cost constraints. The invention thus also relates to nail varnishes comprising a compound of formula (1) as described above.

Styling gels generally contain:
water as solvent;
a gelling agent, which may be, for example, hydroxyethylcellulose, an ethylene-maleic anhydride copolymer or a carbomer (acrylic acid homopolymer cross-linked with an allyl ether of pentaerythritol, an allyl ether of sucrose or an allyl ether of propylene);
a fixing polymer, which may especially be polyvinylpyrrolidone (PVP), a polyvinylpyrrolidone/vinyl acetate blend, or terpolymers;
a conditioning agent, for instance polyquaternium-11, polyquaternium-4 or polyquaternium-7, a PVP/dimethylaminoethyl methacrylate copolymer blend, or a guar;
a plasticizer, for instance dimethicone copolyol.

For the implementation of the invention in gels of this type, the gel constitutes the matrix and the compound of formula (1) is present as additive in this matrix. The amount of compound used is usually from 0.5% to 4% by mass relative to the gel. It will be noted, in this case also, that these values are given as a guide, they are not critical and may be modified, in this case also, as a function of the intensity of the desired effect and of the cost constraints.

The invention thus also relates to styling gels comprising a compound of formula (1) as described above.

The material of the invention may also be used in the manufacture of fabrics for clothing, in the construction of buildings or shelters, or in the motor vehicle industry. Thus, it may be used in the manufacture of luminescent films for nonagricultural applications, for luminescent paints or glasses with luminescent coatings for buildings or motor vehicles. The material of the invention may also be used in light-emitting diodes (LEDs). Finally, it may be used in the manufacture of materials that may be used in biotechnological fields.

EXAMPLES

Examples will now be given.

Example 1

This example relates to the preparation of a compound corresponding to the composition $Ba_3MgSi_2O_8$: 2% $Eu^{2+}$, 5% $Mn^{2+}$ and corresponding to the formula $Ba_{2.94}Eu_{0.06}Mg_{0.95}Mn_{0.05}Si_2O_8$ (the percentages indicated for the doping ions corresponding to the molar degrees of substitution of the $Eu^{2+}$ and $Mn^{2+}$ ions with $Ba^{2+}$ and $Mg^{2+}$ ions, respectively). The process is performed via the solid route, by mixing together the oxides $BaCO_3$, $Eu_2O_3$, $(MgCO_3)_4Mg(OH)_2 \cdot 5H_2O$, $MnCO_3$ and $SiO_2$ in stoichiometric proportions. 0.4 mol of $NH_4Cl$ is added to the mixture as flux.

| Starting materials | Amounts used |
| --- | --- |
| $BaCO_3$ | 1.8629 g |
| $Eu_2O_3$ | 0.0339 g |
| $(MgCO_3)_4Mg(OH)_2 \cdot 5H_2O$ | 0.2963 g |
| $MnCO_3$ | 0.0185 g |
| $SiO_2$ | 0.3858 g |
| $NH_4Cl$ | 0.0687 g |

These starting materials are mixed together homogeneously by grinding; the mixture, placed in an aluminum crucible, is introduced into an oven, where it is subjected to two heat treatments. A first heat treatment is performed at 600° C. for 4 hours in air. The mixture, which is gray in color, is then ground and then returned to the oven in an aluminum crucible. After flushing the oven for 4 hours with an Ar/10% $H_2$ mixture, the mixture is heated for 4 hours at 1200° C. under this reductive atmosphere. A temperature increase and decrease ramp of 360° C./hour is used. The product obtained is in the form of a white powder.

Example 2

This example relates to the preparation of a compound corresponding to the composition $Ba_3MgSi_2O_8$: 2% $Eu^{2+}$, 20% $Mn^{2+}$ and corresponding to the formula $Ba_{2.94}Eu_{0.06}Mg_{0.8}Mn_{0.2}Si_2O_8$. The process is performed as in example 1, via the solid route, by mixing together the oxides $BaCO_3$, $Eu_2O_3$, $(MgCO_3)_4Mg(OH)_2 \cdot 5H_2O$, $MnCO_3$ and $SiO_2$ in stoichiometric proportions. 0.4 mol of $NH_4Cl$ is added to the mixture as flux.

| Starting materials | Amounts used |
| --- | --- |
| $BaCO_3$ | 1.8629 g |
| $Eu_2O_3$ | 0.0339 g |
| $(MgCO_3)_4Mg(OH)_2 \cdot 5H_2O$ | 0.2492 g |
| $MnCO_3$ | 0.0740 g |
| $SiO_2$ | 0.3858 g |
| $NH_4Cl$ | 0.0687 g |

The procedure is then identical to that of example 1.

The curves in FIG. 1 give, for the compounds thus obtained, the emission spectrum for an excitation wavelength of 370 nm. It is thus seen that, in response to an excitation in the UV range, the compounds emit in the red range (peak at about 625 nm) and also in the blue range (peak at about 440 nm).

Figure 2:
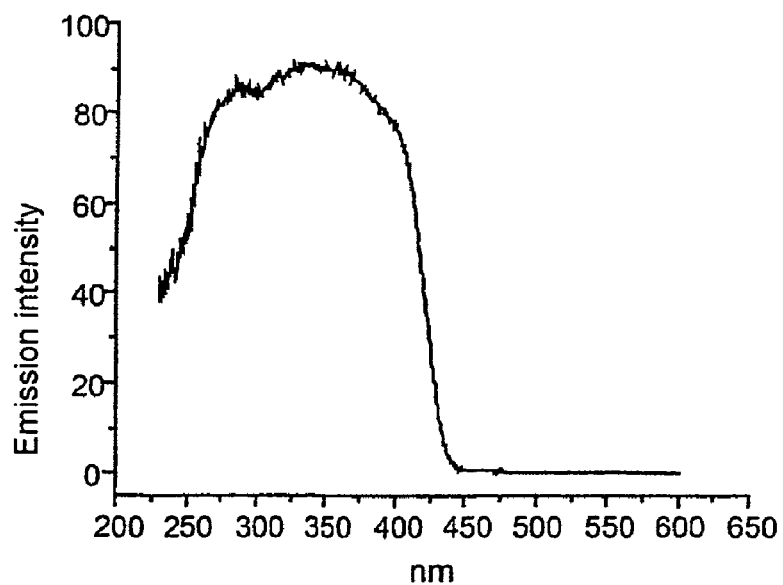
FIG. 2 is a graph representing the excitation spectrum of an additive according to the invention for an emission wavelength of 623 nm.

The excitation spectrum of the compound of example 1, for the emission wavelength 623 nm, is shown in FIG. 2. It is seen from this figure that the maximum yield is achieved for a wavelength of 350 nm. Between 350 nm and 400 nm, the relative yield ranges between 100% and 78%.

Figure 3:
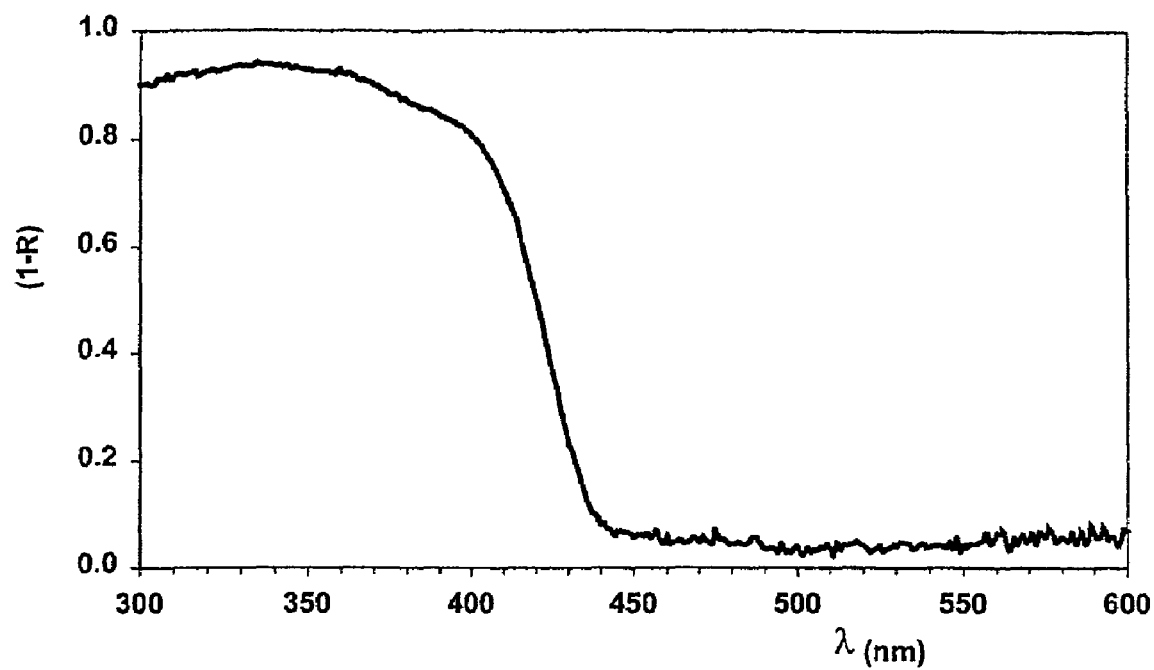
FIG. 3 is a graph representing the variation in the intensity of absorption (1-R, R denoting the intensity of diffuse reflection) as a function of the wavelength for an additive of the invention, measured in synchronous mode using a spectrophotometer equipped with a front monochromator and a back monochromator.

FIG. 3 is a graph, produced in synchronous mode, which shows the variation in intensity of the absorption as a function of the wavelength of the compound of example 1. This graph clearly shows the UV-absorbing capacity of the compound since the reflection intensity is virtually zero for a wavelength of less than about 425 nm.

Example 3

This example illustrates the use of an additive according to the invention in a polymer film.

The product obtained in example 1 is stoved at 90° C. for 12 hours. It is then mixed in a cube mixer for 10 minutes with LDPE Lacqtène 1020FN24, PEG 400 (bonding agent) and an antioxidant Irganox B225. The formulations used are as follows:

| | |
| --- | --- |
| LDPE Lacqtène 1020FN24 | 1495.5 g |
| Silicate of example 1 | 1.5 g |
| Irganox B225 (0.1%) | 1.5 g |
| PEG 400 (0.1%) | 1.5 g |
| Total | 1500 g |

The implementation is performed on a ZSK30 twin-screw extruder on which is fitted a flat die 30 cm wide and of adjustable aperture, and also a cast film machine for drawing the film leaving the extruder so as to bring it to a thickness of 100 μm.

The temperature in the extruder and in the die for the film is 180° C. The temperature at the cast film machine inlet is 70° C. The other conditions are as follows:

| Screw speed | Hopper feed rate | Roll speed | Twin-screw torque | Pressure at die outlet |
| --- | --- | --- | --- | --- |
| 96 rpm | 4 kg/h | 2.3 m/min | 6.3 A | 49 bar |

The film obtained emits a crimson color when it is subjected to illumination at a wavelength of 370 nm.

Example 4

This example gives the results of colorimetric measurements taken on a polymer of the type of that of example 3.

Films are prepared in the same manner as in example 3, with the product of example 1, which, however, has not been subjected to the stoving treatment.

The formulations used in the various tests are given below.

|  | Test 1 control | Test 2 | Test 3 | Test 4 control |
|---|---|---|---|---|
| LDPE Lacqtène 1020FN24 | 1500 g | 1497 g | 1474.5 g | 1477.5 |
| Silicate of example 1 |  | 1.5 g | 1.5 g |  |
| HALS |  |  | 22.5 g | 22.5 g |
| PEG 400 (0.1%) |  | 1.5 g | 1.5 g |  |
| Total | 1500 g | 1500 g | 1500 g | 1500 g |

HALS is a known anti-UV additive (50% Tinuvin 622, 50% Chimasorb 944).

The films prepared have a thickness of between 110 μm and 130 μm.

The films obtained are placed on a contrast card and the chromatic coordinates L, a and b are measured on a white background using a Minolta 508d spectrocolorimeter, the specular component being included. These coordinates are given in the 1976 CIE system (L, a and b) as defined by the Commission Internationale d'Eclairage and listed in the Recueil des Normes Francaises (AFNOR), calorimetric color No. X08-12, No. X08-14 (1983). A Haze measurement is also taken using an XL-211 Hazegard haze-meter from Byk-Gardner.

The values obtained are given below.

|  | L white | L black | a | b | ΔE white | Haze |
|---|---|---|---|---|---|---|
| Test 1 | 92.14 | 42.96 | −0.92 | 4.06 | 0 | 6.4 |
| Test 2 | 91.88 | 42.94 | −0.91 | 4.19 | 0.3 | 8.5 |
| Test 3 | 92.05 | 42.89 | −0.95 | 4.07 | 0.11 | 7.6 |
| Test 4 | 92.05 | 42.73 | −0.95 | 4.11 | 0.12 | 8.8 |

The film of test 1 is colorless. The white ΔE varies in proportions that are below the measurement uncertainties, which shows that the addition of the compound of the invention does not result in any change of the color of the film; for example there is no yellowing. Finally, the Haze measurement allows the transparency of the film to be evaluated. There is no significant variation in the transparency, either.

Finally, in the wavelength range from 250 nm to 750 nm, no appreciable change in the transmission spectrum is observed between the control test film 1 and the test film 2, or between that of test 3 and that of the control test 4.

Example 5

This example relates to the use of the product of example 1 in the preparation of a nail varnish.

This varnish is a transparent base sold by the company Gemey (3.55 g) and containing:
as solvent: ethyl acetate, butyl acetate and nitrocellulose
a phthalic anhydride/glycerol/glycidyl decanoate copolymer
isopropyl alcohol
an acetyl tributyl citrate
stearalkonium hectorite
ethyl tosylamide
citric acid
polyethylene oxide
mica.

3% by mass of the product of the example is added to the above base.

Under UV radiation at 370 nm, the varnish obtained emits crimson light.

Example 6

This example relates to the use of the product of example 1 in the preparation of a styling gel.

A styling gel sold by the company Garnier (Fructis Style) and containing the following is used:
water
denatured alcohol
a PVP/dimethylaminoethyl methacrylate copolymer
a hydroxypropyl guar
hydroxypropylcellulose
a hydrogenated castor oil PEG 40
PEG 192 (apricot kernel glycerides)
PEG 70 (mango glycerides)
triethanolamine
polyquaternium-11
dimethicone copolyol
pentasodium pentenate
4-benzophenone
propylene glycol
a carbomer
an active agent from fruit (citrus limonum)
a fragrance.

0.5% by mass of product of the example is added to the above gel.

Under UV radiation at 370 nm, the gel obtained emits crimson light.

The invention claimed is:

1. A material capable of converting UV or near UV radiation into emitted light in the red range, the material comprising a matrix and an additive, wherein the additive is a compound of formula:

$$Ba_{3(1-x)}Eu_{3x}Mg_{1-y}Mn_ySi_2O_8 \quad (1)$$

wherein: $0 < x \leq 0.3$ and $0 < y \leq 0.3$.

2. The material as claimed in claim 1, wherein in formula (1): $0.0001 \leq x \leq 0.25$ and $0.0001 \leq y \leq 0.25$.

3. The material as claimed in claim 1, wherein in formula (1): $0.01 \leq x \leq 0.03$ and $0.04 \leq y \leq 0.06$.

4. The material as claimed in claim 1, wherein the matrix is based on a polymer selected from the group consisting of low-density polyethylenes, linear low-density polyethylenes, polyethylenes obtained by metallocene synthesis, polyvinyl chloride, polyethylene terephthalate, polystyrene, polymethyl methacrylate, polyethylene-vinyl alcohol, blends based on these (co)polymers, copolymers based on these (co)polymers, and polycarbonate.

5. The material as claimed in claim 1, wherein the matrix is a nail varnish.

6. A greenhouse wall, formed at least in part of the material of claim 1.

7. A light-converting material comprising a polymer-based matrix and an additive, wherein the additive is a compound of formula:

$$Ba_{3(1-x)}Eu_{3x}Mg_{1-y}Mn_ySi_2O_8 \quad (1)$$

wherein $0 < x \leq 0.3$ and $0 < y \leq 0.3$.

8. A light-converting material comprising a paint, varnish or latex-based matrix and an additive, wherein the additive is a compound of formula:

$$Ba_{3(1-x)}Eu_{3x}Mg_{1-y}Mn_ySi_2O_8 \qquad (1)$$

wherein $0<x\leqq0.3$ and $0<y\leqq0.3$.

9. A light-converting material comprising a styling-gel based matrix and an additive, wherein the additive is a compound of formula:

$$Ba_{3(1-x)}Eu_{3x}Mg_{1-y}Mn_ySi_2O_8 \qquad (1)$$

wherein $0<x\leqq0.3$ and $0<y\leqq0.3$.

* * * * *